United States Patent
Herchl et al.

(10) Patent No.: US 12,202,946 B2
(45) Date of Patent: Jan. 21, 2025

(54) METHOD FOR THE RECOVERY OF STARTING MATERIALS FROM BLENDED TEXTILE WASTES

(71) Applicant: LENZING AKTIENGESELLSCHAFT, Lenzing (AT)

(72) Inventors: Richard Herchl, Ried im Innkreis (AT); Christoph Klaus-Nietrost, Vocklabruck (AT); Sabrina Theis, Wels (AT); Christian Weilach, Vocklabruck (AT)

(73) Assignee: Lenzing Aktiengesellschaft, Lenzing (AT)

( * ) Notice: Subject to any disclaimer, the term of this patent is extended or adjusted under 35 U.S.C. 154(b) by 146 days.

(21) Appl. No.: 17/784,508

(22) PCT Filed: Dec. 3, 2020

(86) PCT No.: PCT/EP2020/084540
§ 371 (c)(1),
(2) Date: Jun. 10, 2022

(87) PCT Pub. No.: WO2021/115931
PCT Pub. Date: Jun. 17, 2021

(65) Prior Publication Data
US 2023/0125354 A1  Apr. 27, 2023

(30) Foreign Application Priority Data
Dec. 13, 2019  (EP) ..................... 19215960

(51) Int. Cl.
*C08J 11/16* (2006.01)
*C08B 16/00* (2006.01)
*C08J 11/06* (2006.01)

(52) U.S. Cl.
CPC .............. *C08J 11/16* (2013.01); *C08B 16/00* (2013.01); *C08J 11/06* (2013.01); *C08J 2301/00* (2013.01); *C08J 2367/00* (2013.01)

(58) Field of Classification Search
CPC .. C08B 16/00; C08J 11/06; C08J 11/14; C08J 11/16; C08J 2301/00; C08J 2367/00; C08J 2467/00; Y02W 30/62; Y02W 30/66
See application file for complete search history.

(56) References Cited

U.S. PATENT DOCUMENTS

| | | |
|---|---|---|
| 5,395,858 A | 3/1995 | Schwartz, Jr. |
| 6,075,163 A | 6/2000 | Roh et al. |
| 9,611,371 B2 | 4/2017 | Walker |
| 10,316,467 B2 | 6/2019 | Weilach et al. |
| 11,519,104 B2 | 12/2022 | Klaus-Nietrost et al. |
| 2015/0232632 A1 | 8/2015 | Walker |
| 2016/0237619 A1 | 8/2016 | Weilach et al. |
| 2019/0218362 A1* | 7/2019 | Barla ............... C08B 16/00 |
| 2020/0165747 A1 | 5/2020 | Lindgren et al. |
| 2020/0347520 A1 | 11/2020 | Klaus-Nietrost et al. |
| 2021/0130501 A1 | 5/2021 | Silbermann et al. |
| 2021/0340350 A1* | 11/2021 | Flynn ............... D21C 5/005 |

FOREIGN PATENT DOCUMENTS

| | | |
|---|---|---|
| EP | 3511448 A1 | 7/2019 |
| JP | H11-502868 A | 3/1999 |
| WO | 2014/045062 A1 | 3/2014 |
| WO | 2015/077807 A1 | 6/2015 |
| WO | 2017/019802 A1 | 2/2017 |
| WO | 2018/073177 A1 | 4/2018 |
| WO | 2018/115428 A1 | 6/2018 |

* cited by examiner

*Primary Examiner* — Dennis R Cordray
*Assistant Examiner* — Matthew M Eslami
(74) *Attorney, Agent, or Firm* — Venable LLP

(57) ABSTRACT

What is shown is a method for the recovery of raw materials from blended textile wastes, which includes the following steps in the given order: a) providing blended textile waste that includes at least a cellulose component and at least a polyester component, b) treating the blended textile waste in an aqueous treatment solution in order to depolymerize the polyester component and dissolve it in the treatment solution, c) separating the cellulose component from the treatment solution and recovering a cellulose raw material, d) filtering the treatment solution in order to remove foreign substances, particularly dyes and metal ions, from the treatment solution, and e) precipitating terephthalic acid from the treatment solution, separating the precipitated terephthalic acid, and recovering a terephthalic-acid-including polyester raw material. In order to, within the scope of the mentioned method, enable the recovery of raw materials with an increased level of purity, it is proposed that filtering the treatment solution in step d) should at least comprise a filtration by an adsorbent filter medium.

9 Claims, No Drawings

METHOD FOR THE RECOVERY OF STARTING MATERIALS FROM BLENDED TEXTILE WASTES

The present application is a national-stage entry under 35 U.S.C. § 371 of International Patent Application No. PCT/EP2020/084540, published as WO 2021/115931 A1, filed Dec. 3, 2020, which claims priority to EP 19215960.6, filed Dec. 13, 2019, the entire disclosure of each of which is hereby incorporated by reference.

BACKGROUND OF THE INVENTION

Technical Field

The present invention relates to a method for the recovery of raw materials from blended textile wastes.

Background Art

In recent years, the recovery or recycling of raw materials from textile wastes has increasingly gained in importance for the textile industry, not least to reduce the environmental impact of these textile wastes.

Purely mechanical recycling of textile wastes has been commonly known for quite some time, wherein textile waste is comminuted and, from it, directly recycled end products such as cleaning wipes, filling materials, or insulating materials are produced. The spinning of yarns from such recycled textile fibers usually results in low-quality yarns that, only to a limited extent, are suitable for the production of new textiles.

Chemical recycling methods lend themselves to overcoming the above mentioned problems. For example, cellulosic fibers can, following chemical pretreatment, be spun into regenerated cellulosic fibers again. However, such processes for the production of regenerated cellulosic molded bodies are very sensitive to impurities in the cellulose raw material, which is why cellulose raw material recycled in this way is generally unsuited for spinning it into fibers.

WO 2015/077807 A1 shows a process for pretreating reclaimed cotton fibers from textile wastes wherein, at first, metals are removed from said reclaimed cotton fibers which are then subjected to oxidative bleaching. The cotton fibers reclaimed in this way can then be used for the production of molded bodies from regenerated cellulose.

WO 2018/115428 A1 discloses a method for treating cotton-based raw material under alkaline conditions in combination with gaseous oxidizing agents.

WO 2018/073177 A1, in turn, describes a method for recycling cellulose raw material from cellulosic textile waste. In this case, the textile waste is treated under alkaline conditions in the presence of a reducing agent in order to swell the cellulosic fibers in the textile waste and to, in this way, facilitate the removal of foreign substances. Following the alkaline treatment, the cellulose raw material is bleached with oxygen and/or ozone.

Such methods generally use pure cellulosic textile waste as a starting material. However, in practice, the textile wastes from clothing and fabrics are blended textile wastes, that is, blends of cellulosic and synthetic fibers. Here, the predominant fraction is blended textile wastes that include polyester and cellulosic fibers. Likewise, textile wastes from cotton textiles are, in most cases, contaminated with polyester from sewing threads, labels, or the like. Yet, methods of the above-mentioned type are usually unable to process blended textile wastes because significant contaminations with synthetic polymer fibers cannot be removed.

WO 2014/045062 A1 in turn describes a method for extracting polyester from textiles with the help of extraction solvents. This makes recovering the polyester component possible; however, the cellulose component is heavily contaminated due to extraction solvent residues, the significant degradation of the molecular chain, and residues of remaining polyester, respectively, and unsuited for use in a method for the production of regenerated cellulosic molded bodies. In addition, the polyester component is contaminated with foreign substances, dyes, matting agents, etc., and, as a result of the dissolving process, significantly altered in its molecular length and its properties, which makes additional treatment processes for the polyester component indispensable.

DISCLOSURE OF THE INVENTION

Therefore, it is an object of the invention to provide a method of the type mentioned at the outset for the recovery of raw materials from blended textile wastes, which makes it possible to recover raw materials of higher purity levels.

According to the invention, the defined object is achieved by a method as claimed in claim 1.

By providing blended textile waste that contains at least a cellulose component and at least a polyester component, treating the blended textile waste in an aqueous treatment solution in order to depolymerize the polyester component and dissolve it in the treatment solution, separating the cellulose component from the treatment solution, and recovering a cellulose raw material, a cellulose raw material of a high quality can be recovered from blended textile wastes in a process-technically simple manner and consequently be put to renewed use as a cellulosic starting material. Furthermore, by filtering the treatment solution in order to remove foreign substances from the treatment solution and precipitating of terephthalic acid from the treatment solution, separating the precipitated terephthalic acid, and recovering a polyester raw material that includes terephthalic acid, a particularly advantageous utilization and recovery of the polyester component can be achieved, in the course of which the polyester raw material obtained can again be fed as a starting material for the production of polyester.

For the purposes of the present invention, "polyester" mainly refers to polyethylene terephthalate (PET) which consists of the monomers terephthalic acid and ethylene glycol. However, the invention also works very well with other widely used polyesters such as polypropylene terephthalate (PPT), polytrimethylene terephthalate (PTT), polybutylene terephthalate (PBT), and the like, or also with mixtures of these polyesters. In each case, it is important that the alcoholic component, i.e., ethylene glycol, butane diol, propylene diol, trimethylene glycol, etc., is readily soluble in the treatment solution and is not precipitated along with the terephthalic acid.

If the filtration of the treatment solution in step d) comprises at least a filtration through an adsorbent filter medium, particularly in order to remove dyes and metal ions from the treatment solution, then it can be ensured that the precipitate of terephthalic acid obtained in step e) will be of high purity, following precipitation from the treatment solution. Otherwise, the metal ions and dyes, respectively, exhibit a high affinity toward binding to the terephthalate molecules, whereby they would contaminate the terephthalic acid precipitate during precipitation and heavily impair the quality of the recovered terephthalic-acid-containing starting material. With the inventive filtration through an adsorbent filter medium, the main contaminations can be removed efficiently already prior to the precipitation from the treatment solution, as they preferably bind to the particles of the adsorbent filter medium.

If the adsorbent filter medium also includes active carbon and/or zeolite, then, in view of the adsorbent and reductive property of the active carbon, impurities such as degradation products of the dyes and textile auxiliaries can be adsorbed with particularly high reliability and in part selectively and removed from the treatment solution. This selectivity can be increased further by additional coating of the adsorbent filter medium.

For the purposes of the present invention, "recycled cellulose raw material" generally refers to recycling pulp, textile pulp, cotton pulp, rag pulp, or the like, or combinations thereof. More specifically, such cellulose raw material can be suited as a starting material for the production of regenerated cellulose fibers such as lyocell, viscose, modal, or cupro fibers. Alternatively, the recycled cellulose raw material can serve as a starting material for the production of paper, paper-like materials, or nonwovens made from pulp.

In general, it is mentioned that, for the purposes of the present invention, "blended textile waste" may be a blend containing any given cellulose fibers which form the cellulose component of the blended textile waste and any given polyester fibers which form the polyester component. Suitable cellulose fibers include, for example, natural cellulose fibers such as cotton, flax, hemp, ramie, kapok, etc., or regenerated cellulose fibers such as rayon, viscose, lyocell, cupro, or modal. The synthetic polymer component can, for example, comprise polyamide or polyester fibers or also other synthetic fibers that can be degraded by means of hydrolysis. The above-mentioned fibers may vary in diameter and length and may be continuous fibers (filaments) or staple fibers or also be present in nonwoven form. Such blended textile waste includes at least 1% by weight, preferably at least 2% by weight, more preferably at least 3% by weight, of each of the cellulose component and the polyester component.

Furthermore, a particularly economical and reliable recycling method can be provided if the blended textile waste is pre-consumer and/or post-consumer textile waste. Post-consumer textile waste refers to textiles that had already arrived at the end consumer and, as a result of having been used, may contain foreign substances, sometimes in considerable amounts. Post-consumer textile waste can comprise one or several of the following elements: used clothes such as shirts, jeans, skirts, dresses, suits, coveralls, pants, underwear, sweaters, and the like; used home textiles such as bed linen, towels, curtains, cloths, tablecloths, seat covers, upholstery fabrics, or the like; nonwoven products such as wipes, diapers, filters, or the like. Pre-consumer textile waste refers to textile materials that had not yet arrived at the end consumer, but resulted as waste in the course of production processes. This may include cutting residues or wastes from the production of clothing, home textiles, nonwovens, etc., or wastes from the production of yarns, textiles, or regenerated cellulose fibers.

The method can be improved further if the aqueous treatment medium includes at least one hydrolyzing agent. Furthermore, in such case, the quantity of the at least one hydrolyzing agent can be adjusted to the quantity of the polyester component in the blended textile waste so that the polyester component is substantially depolymerized in full during the treatment in step b), i.e., that the hydrolyzing agent is added in at least such an amount that substantially all hydrolytically splittable bonds in the polyester component are broken up during the treatment in step b). Here, the hydrolyzing agent can accelerate the hydrolysis reaction during the splitting of the hydrolytically splittable bonds in the polyester component. The hydrolytically splittable bonds in the polyester component are substantially the ester bonds formed between the monomers terephthalic acid and ethylene glycol. The quantity of hydrolyzing agent needed in relation to the content of the polyester component in the blended textile can be added to the treatment solution by appropriate dosing prior to and/or after the treatment in step b). Here, dosing can, in particular, be carried out in a way that, following the complete depolymerization of the polyester component, no excess hydrolyzing agent will remain in the treatment solution, which is why no increased degradation of the cellulose component by excess hydrolyzing agent will take place and an improvement of the quality of the cellulose raw material recovered in step c) can thus be achieved. Furthermore, dosing can also be carried out in a way that, following the complete depolymerization of the polyester component, a certain quantity of hydrolyzing agent will deliberately left behind in the treatment solution, by means of which the chain length of the molecules in the cellulose component can be degraded to a desired extent and the viscosity of the recovered cellulose raw material can thus be adjusted. Hence, it is possible to provide a method offering improved control of the behavior of degradation reactions of the polyester component and the cellulose component.

If the aqueous treatment solution is an aqueous alkaline treatment solution, then the controllability of the method can be further improved. Here, the hydrolysis of the polyester component in the treatment solution can predominantly take place as an alkaline hydrolysis or saponification and feature a faster reaction speed as compared to the aqueous hydrolysis. If the hydrolyzing agent is a base, then a particularly simple and cost-effective method can, in addition, be created. The base can act as an effective accelerator in the alkaline hydrolysis reaction for splitting the ester bonds. During this alkaline hydrolysis reaction, the base is used up in the reaction—for example, by the formation of salts with the monomeric constituents of the split polyester component. In addition, the formed salt of the terephthalic acid (disodium terephthalate) advantageously exhibits high solubility in the aqueous solution. Thus, following the complete degradation of the synthetic polymer component, there remains only a small excess of free base in the aqueous alkaline treatment solution, and the degradation of the cellulose component can be reduced effectively. Furthermore, the treatment of the cellulose component in the aqueous alkaline treatment solution is suited to remove the dyes, foreign substances, impurities, or textile auxiliaries (for example, cross-linking agents) bound to the cellulose component. This way, a purified, recycled cellulose raw material of a higher quality can be obtained.

If the base used as the hydrolyzing agent is sodium hydroxide (NaOH), large amounts of which are used for the treatment of pulp and cellulose raw material, then a reliable and cost-efficient method can be provided. In such a case, the total content of NaOH in the aqueous alkaline treatment medium can be in the range from 10 to 300 g, for example from 20 to 250 g, per kg of the blended textile waste, depending on the proportion of the polyester component in the blended textile waste.

If, during the treatment of the blended textile waste in step b), the treatment solution has a temperature greater than 100° C., particularly greater than 110° C., then a very reliable depolymerization of the polyester component into its monomeric constituents can take place. In addition, if the treatment solution has a temperature of less than 200° C., sufficiently mild process conditions can be guaranteed such that any excessive degradation of the cellulose component can be avoided. In further embodiments of the invention, the temperature can particularly be between 110° C. and 190° C., preferably between 120° C. and 180° C., more preferably between 125° C. and 175° C., most preferably between 130° C. and 170° C.

Furthermore, if separating of the cellulose component in step c) includes at least screening, pressing, or centrifuging of the treatment solution, then the recovered cellulose raw material can be obtained from the treatment solution in a technically simple manner. In this case, the substantially non-degraded or substantially non-dissolved cellulose component can simply be separated from the treatment solution. Due to the degradation processes described, part of the cellulose component may be present as dissolved in the treatment solution and thus remains in the treatment solution during the separation in step c)—just like the dissolved monomeric constituents of the polyester component and foreign substances.

The precipitation of the terephthalic acid in step e) can be facilitated if step e) includes at least an acidification of the treatment solution. Such acidification can include, in particular, an addition of an acid to the treatment solution, in which case the addition of the acid can, for example, take place until the complete precipitation of the terephthalic acid or, alternatively, until the pH drops below a certain value. The acid used can preferably be sulfuric acid ($H_2SO_4$) which is commonly used in cellulose pulping processes.

The reliability of the method can be improved further if the blended textile waste is comminuted and/or singularized prior to the treatment in step b). Comminuting and/or singularizing the blended textile waste can be used to mechanically separate the cellulose parts from the polyester parts and thus enable a more reliable degradation (dissolution) of the polyester component in the aqueous treatment medium.

The reliability of the method can be improved even further if, prior to the treatment in step b) non-fiber solids are at least partially removed from the blended textile waste. Non-fiber solids can for example include buttons, zippers, decoration elements, prints, labels, and/or dirt, or parts thereof.

According to the invention, the cellulose raw material recovered according to the afore-described method can also be suitable for the production of regenerated cellulosic fibers, particularly according to a viscose, modal, cupro, or lyocell process.

MODES FOR CARRYING OUT THE INVENTION

In the following, the invention is exemplified based on a first embodiment variant. Further embodiment variants follow from the modifications mentioned in the description which can be combined with one another in any given way.

According to a first embodiment variant, the method according to the invention for the recovery of raw materials from blended textile wastes, in a first step, provides blended textile waste including at least a cellulose component and at least a polyester component. In this case, such blended textile waste contains a blend of any given cellulose fibers that form the cellulose component and any given polyester fibers that form the polyester component. For example, in one embodiment variant the blended textile waste contains a blend of cotton and polyester fibers (more specifically, PET), wherein these can be blended at the yarn level in the blended textile.

In a further step, the blended textile waste is then treated in an aqueous treatment solution in order to depolymerize the polyester component and dissolve it in the treatment solution. In the first embodiment variant, the aqueous treatment solution is an aqueous alkaline treatment solution, particularly diluted soda lye, which includes NaOH as the hydrolyizing agent. The treatment takes place at temperatures greater than 100° C., and preferably at temperatures greater than 110° C. During the depolymerization of the polyester component, the molecular weight and the molecular chain length of the polyester molecules are deliberately reduced by hydrolysis which takes place in the presence of the aqueous treatment solution. In this way, the degraded molecules of the polyester component are gradually reduced in their molecular chain length and ultimately split into their monomeric starting materials, i.e., terephthalic acid and the alcohol ethylene glycol ($C_2H_6O_2$). In this process, the terephthalic acid consumes two Na ions and forms a terephthalate salt, namely, disodium terephthalate ($C_8H_4O_4Na_2$). As a result of the hydrolysis, the readily soluble disodium terephthalate and ethylene glycol are present in the aqueous treatment solution in a dissolved form. Subsequently, this enables a process-technically simple separation of the depolymerized polyester component from the cellulose component, whereby the cellulose raw material can be recovered with a high level of purity from the blended textile waste. In fact, due to the generally mild process conditions, only a small, relatively insignificant degradation of the cellulose polymers in the cellulose component takes place, more specifically so small that substantially no or only minimal quantities of glucose monomers are separated from the cellulose polymers. At the same time, however, the cellulose component can advantageously be partially pulped by the treatment solution and be freed of impurities such as bonded dyes or cross-linking agents, which in turn benefits the quality and purity of the recovered cellulose raw material.

In another embodiment of the method, the blended textile waste contains other polyesters such as PTT, PBT, etc., as the polyester component, as a consequence whereof other alcohols are formed accordingly as monomeric starting materials in the depolymerization. In such cases, the above-described method can be applied analogously.

In a further step, the cellulose component is then separated from the treatment solution, and, in this process, a cellulose raw material is recovered. Since the depolymerized polyester component is present in a dissolved state in the aqueous treatment solution, together with the dyes and foreign substances dissolved out from the cellulose component, the insoluble cellulose component can be separated from the liquid portion, i.e., the treatment solution, by means of a simple solid/liquid separation such as screening, pressing, or centrifuging. This way, a purified and conditioned cellulose component is obtained as cellulose raw material. Subsequently, this cellulose raw material can still be washed and/or dried in order to condition it for further use. The aqueous alkaline treatment solution remaining behind as a liquid in the separation now still contains the depolymerized polyester components (disodium terephthalate and ethylene glycol) and possible contamination with foreign substances.

The treatment solution remaining behind is now filtered in a next step in order to separate the undesired substances from the depolymerized polyester component. In this process, the treatment solution is, according to the invention, filtered through an adsorbent filter medium. This filtration can, in particular, be implemented in the form of a fixed bed filter, but it is also possible to disperse the filter medium in the treatment solution and to then again separate the filter medium loaded with the solids to be separated by means of a simple solid/liquid separation. In the first embodiment variant, the adsorbent filter medium contains active carbon and/or zeolite. In further embodiment variants, however, the filter medium can also include other adsorbent filter media that are suited for the adsorption of metal ions/dyes, etc. In fact, the active carbon enables a particularly reliable and even selective adsorption of dyes, metal ions, or textile auxiliaries such as cross-linking agents, these substances being preferably adsorbed due to the reductive action of active carbon. This selectivity can, for example, be enhanced further in another embodiment variant by additionally coating the adsorbent filter medium, i.e., especially the active carbon and the zeolite, respectively, with suitable substances.

In a last step, the terephthalic acid is precipitated as a precipitate from the treatment solution in order to recover a reusable and purified polyester raw material. With the preceding filtration, it can be ensured that, during the precipitation step, no foreign substances are incorporated into the terephthalic acid precipitate, which would eventually lead to in part substantial contamination such that the terephthalic acid could only be made available again for subsequent usability, e.g., for repolymerization, through complex and cost-intensive purification steps. For the precipitation, a suitable acid, e.g., sulfuric acid, is added to the treatment solution, or the treatment solution is acidified with it, until the terephthalic acid separates from the treatment solution in the form of a precipitate. Since the acid anions neutralize with the Na cations of the disodium terephthalate, terephthalic acid is formed during the acidification, which exhibits very low solubility and precipitates immediately from the solution. Following the complete precipitation of the terephthalic acid, it is again separated from the liquid through a simple solid/liquid separation by means of commonly known procedural steps, rewashed if necessary, and the terephthalic acid is finally obtained as a polyester starting material.

EXAMPLES

Example 1: Post-consumer waste textiles (mixture of cotton and polyester, 80 to 20 wt %) were cooked with soda lye (15 wt % of NaOH, based on the mass of waste textiles) at a liquor ratio of 1:7 (mass of waste textiles:lye). The temperature was 150° C. for a cooking duration of 120 min. Because of the depolymerization of the polyester fibers which took place under these conditions, the disodium terephthalate formed and water-soluble under these conditions got into the cooking liquor which was eventually separated from the remaining solid material (the cotton fibers) by means of a screen.

The separated lye was agitated with an excess of active carbon, whereby impurities such as metal ions and dyes and/or their degradation products were adsorbed selectively and thus removed from the lye. Approx. 100 g of active carbon per 2000 ml of lye were used, which were stirred for 1 hour at room temperature. Then, the active carbon was separated and sedimented by means of filtration and subsequent centrifuging, and the supernatant was suctioned off by using a paper filter. Then, the active-carbon-free filtrate was acidified to pH 2 using sulfuric acid. This caused the terephthalic acid to precipitate as a precipitate which was subsequently suctioned off using glass frits and dried in the drying chamber.

As a result of the preceding active carbon filtration, the terephthalic acid obtained was nearly free of contamination, which is demonstrated, by way of example, based on the analyzed metal contents (see Table 1), and could therefore be reused without complex further purification steps.

The metal contents were determined as follows: Approx. 20 g of the sample were ashed, the ash was subsequently subjected to melting digestion with sodium tetraborate, and the residue was dissolved using 1.6 M nitric acid. For the photometric determination of the iron content, potassium thiocyanate was added to the sample, and then the red coloration of the iron thiocyanate was measured by means of a calibration curve. For the photometric determination of the silicon content, ammonium molybdate was added to the sample, and then the blue coloration of the silicon molybdate was measured by means of a calibration curve. Phosphates were complexed by oxalic acid in order to mask them.

Example 2 (comparison example): The method according to Example 1 was repeated, however, without the active carbon purification stage.

TABLE 1

| Example | Fe [mg/kg] | Si [mg/kg] |
|---------|------------|------------|
| 1       | 9.8        | 215        |
| 2       | 58.4       | 1304       |

The invention claimed is:

1. A method for the recovery of raw materials from blended textile wastes, including the steps in the given order:
   providing blended textile waste containing at least a cellulose component and at least a polyester component comprising at least one of polyethylene terephthalate, polypropylene terephthalate, polytrimethylene terephthalate, and polybutylene terephthalate,
   treating the blended textile waste in an aqueous treatment solution in order to depolymerize the polyester component and dissolve the polyester component in the aqueous treatment solution,
   separating the cellulose component from the aqueous treatment solution and recovering a cellulose raw material,
   filtering the aqueous treatment solution in order to remove foreign substances from the aqueous treatment solution, and
   precipitating terephthalic acid from the aqueous treatment solution, separating the precipitated terephthalic acid, and recovering a terephthalic-acid-including polyester raw material,
   wherein the filtering step comprises at least a filtration by an adsorbent filter medium configured for a fixed bed filter implementation, and wherein the aqueous treatment solution is an aqueous alkaline treatment solution, the aqueous alkaline treatment solution including a hydrolyzing agent.

2. The method of claim 1, wherein the adsorbent filter medium includes active carbon and/or zeolite.

3. The method of claim 1, wherein the aqueous treatment solution, during the treating step, has a temperature greater than 100° C.

4. The method of claim 1, wherein the separating step includes at least screening, pressing, or centrifuging.

5. The method of claim 1, wherein the precipitating step includes at least acidifying of the aqueous treatment solution.

6. The method of claim 1, wherein the foreign substances include dyes and metal ions.

7. The method of claim 1, wherein the hydrolyzing agent is a base.

8. The method of claim 7, wherein the base is NaOH.

9. The method of claim 1, wherein the aqueous treatment solution, during the treating step, has a temperature greater than 110° C.

* * * * *